S. R. BAILEY.
AUTOMOBILE RUNNING GEAR.
APPLICATION FILED SEPT. 22, 1911.

1,095,137.

Patented Apr. 28, 1914.
2 SHEETS—SHEET 2.

Witnesses:
H. B. Davis.
J. L. O'Neill

Inventor:
Samuel R. Bailey

UNITED STATES PATENT OFFICE.

SAMUEL R. BAILEY, OF AMESBURY, MASSACHUSETTS.

AUTOMOBILE RUNNING-GEAR.

1,095,137.      Specification of Letters Patent.      Patented Apr. 28, 1914.

Application filed September 22, 1911. Serial No. 650,766.

*To all whom it may concern:*

Be it known that I, SAMUEL R. BAILEY, a citizen of the United States, residing at Amesbury, in the county of Essex and State of Massachusetts, have invented an Improvement in Automobile Running-Gear, of which the following is a specification.

This invention relates to certain improvements in the running gear of a motor vehicle, or the means for supporting the body on the axles.

It has usually been customary, in vehicles of this character, to arrange a pair of side springs, both at the front and the rear of the body, so that it is supported at four points. With this arrangement, when one of the front wheels passes over an obstruction, or raised portion of the street, which tends to lift it higher than the opposite wheel, the body is sometimes tipped to a dangerous extent, while ordinary inequalities which raise one wheel higher than the other will cause the body to be repeatedly raised and lowered at different corners, so as to cause a twisting, or unequal lifting strain to be placed on the body.

Figure 1:
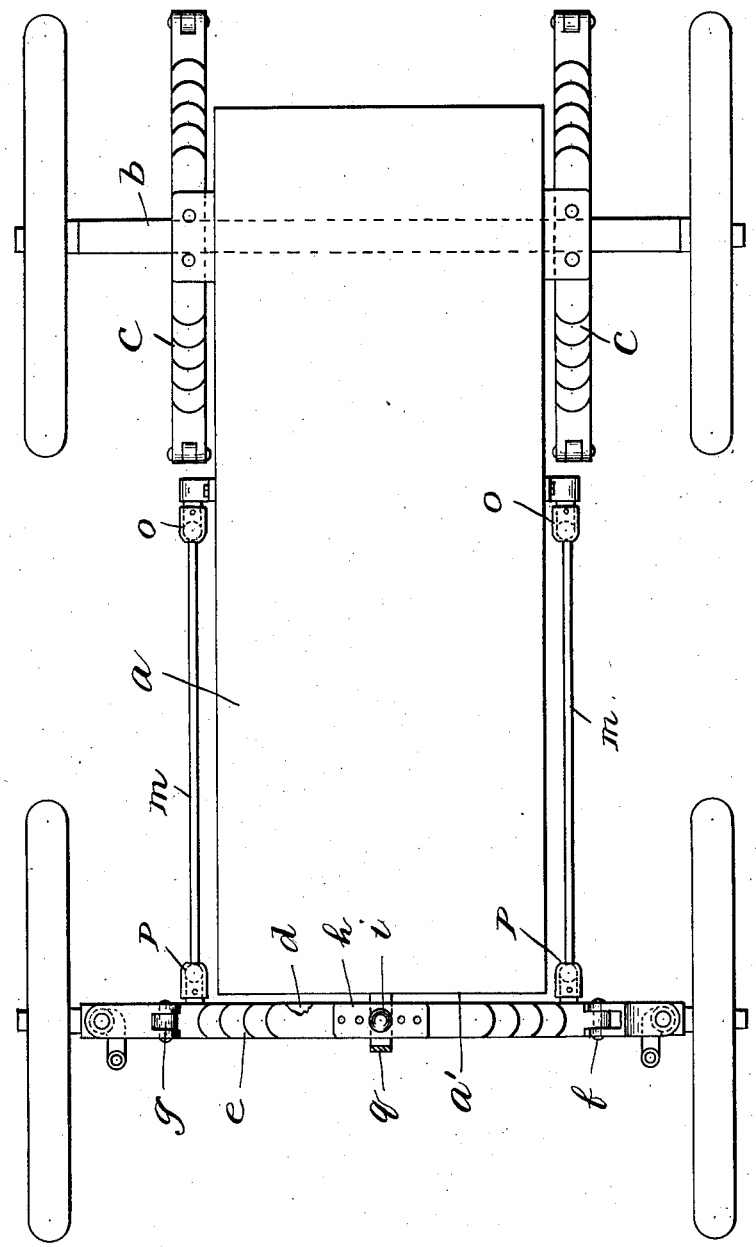
Figure 2:
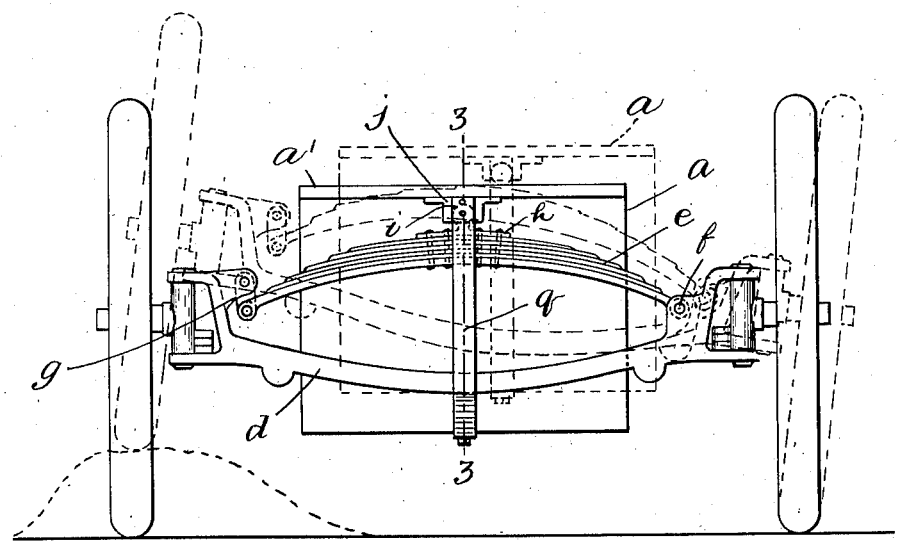
Figures 3, 4:
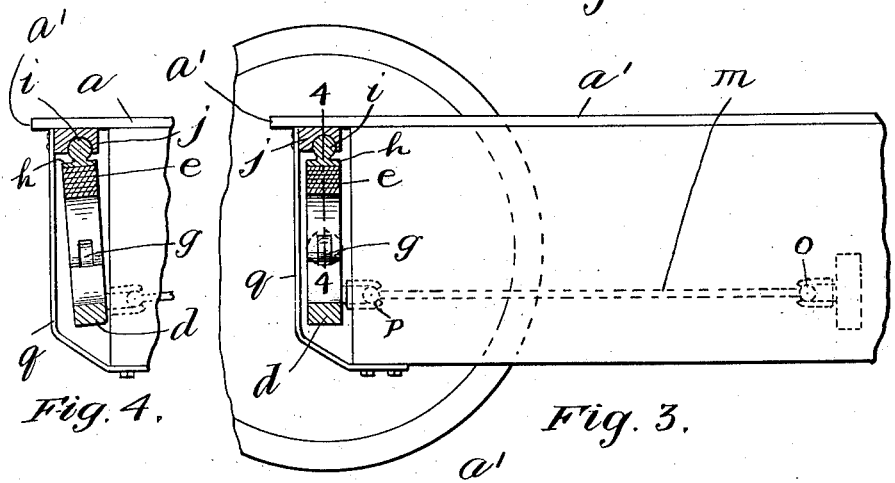
Figure 5:
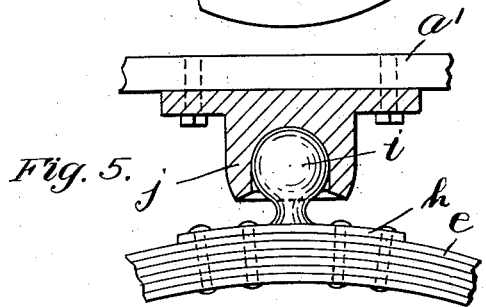
Figure 6:
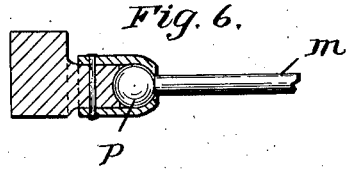

The object of my invention is to provide a simple and durable construction for so supporting the body of an automobile on its axis, that when it passes over inequalities, or obstructions which act to raise one wheel higher than the other, a corresponding tipping, or lifting of the body will not be caused. I accomplish this object by the means shown in the accompanying drawing, in which, Figure 1 is a plan view of the running gear of an automobile provided with my invention. Fig. 2 is a front elevation thereof. Fig. 3 is a sectional view on the line 3—3 of Fig. 2. Fig. 4 is a detail view similar to Fig. 3, showing the parts in different position. Fig. 5 is a detail view on an enlarged scale taken at the line 4—4 of Fig. 3. Fig. 6 is a detail view of one of the ball and socket joints.

In the drawing $a$ indicates the body, $b$ the rear axle on which a pair of side springs $c$ are mounted, and connected to the body at each side thereof, as is customary in motor vehicles.

The front axle $d$ is arranged at a short distance in front of the body, and a leaf spring $e$ is mounted on the upper side thereof, and has a pivotal connection $f$ with the axle at one end, and a link connection $g$ therewith at the other end, to permit depression of the spring.

According to my invention I mount a base plate $h$ on the upper side of spring $e$, said plate having an integrally connected ball $i$ projecting from the upper side thereof, arranged at the middle of the spring $e$, as shown.

A base socket piece $j$ is mounted on the under side of a forwardly projecting flange, or bracket $a'$ on the front end of the body, said socket piece having a ball-receiving socket in its under side in which the ball $i$ is held, the coacting parts being constructed to permit universal tipping and swinging movement of the spring $e$ with relation to the body.

A pair of horizontally disposed brace rods or links $m$ are arranged at opposite sides of, and parallel to the body, and are connected thereto, at their rear ends, by ball and socket joints $o$. The front ends of said rods $m$ are connected to the front axle $d$, adjacent the outer ends thereof, by similar ball and socket joints $p$, said joints permitting universal movement of the links with the parts to which they are connected, as may be required. This construction and arrangement of brace rods is well known in the art.

A safety rod $q$ is connected at its upper end to the socket $j$ and extends downwardly therefrom, in front of the spring $e$ and axle $d$, and rearwardly therebeneath, and is connected at its lower end to the body.

The operation of the above described construction is as follows:—In case one of the front wheels is lifted, while the other three remain on a level, the axle $d$ will be correspondingly tilted. The ball and socket connection $i$, $j$, between the spring $e$ and the body will permit a corresponding tilting of said spring without any tendency, within reasonable limits, to cause a corresponding tipping of the body, the body being held in the horizontal position by the rear wheels, and being lifted, to an extent, as indicated in the dotted position of Fig. 2. This not only prevents the tilting of the body, but it also prevents the placing of a twisting strain upon the body, such as would be placed thereon if the body were supported at two points, both at the front and the rear. It will be further apparent that with the latter construction, that, in case one wheel is lifted much higher than the others, either the body must be twisted, or be actually lifted so that the opposite wheel is raised partly or wholly from the ground. A considerable amount of energy is thus wasted in raising the body which is not wasted when my improved construction above described is employed.

As the axle $d$ is lifted at one end, as shown in the dotted position of Fig. 2, the link $m$ at the side which is lifted will be swung upwardly at its front end. As both links are normally held in a horizontal position, this action will cause the axle $d$ to be swung rearward, or toward the body, about the ball $i$ as a center, as shown in Fig. 4, universal movement of the axle $d$ being permitted by said ball point $i, j$. As the axle $d$ is tilted, one link $m$ will be swung away from the body and the other toward it, movement of the links in two directions being permitted by the universal joints $o$ and $p$, which connect the links with the body and axle.

In case either or both of the rods $m$ should break or become disconnected from the body the safety rod $q$ will hold the axle $d$ and spring $e$ from moving very far out of position, so that no serious accident will occur.

I claim:—

An automobile body having an axle extending from side to side thereof, a ball-and-socket joint between said body and the upper side of the axle at the middle thereof, permitting universal swinging movement of the axle, rods pivotally connected to the ends of the axle and the opposite sides of the body, normally held in an approximately horizontal position and longitudinally unyielding to hold the axle from swinging horizontally about a vertical axis and to permit vertical swinging and simultaneous rearward or forward movement of the axle, substantially as described.

In testimony whereof, I have signed my name to this specification, in the presence of two subscribing witnesses.

SAMUEL R. BAILEY.

Witnesses:
 L. H. HARRIMAN,
 H. B. DAVIS.